United States Patent
Kaneko et al.

(10) Patent No.: US 11,820,838 B2
(45) Date of Patent: Nov. 21, 2023

(54) MODIFIED DIENE-BASED POLYMER

(71) Applicants: Sumitomo Rubber Industries, Ltd., Kobe (JP); Shigeru Yamago, Kyoto (JP)

(72) Inventors: Takumi Kaneko, Kobe (JP); Kazuyoshi Shiga, Kobe (JP); Shigeru Yamago, Kyoto (JP)

(73) Assignees: SUMITOMO RUBBER INDUSTRIES, LTD., Kobe (JP); SHIGERU YAMAGO, Kyoto (JP)

( * ) Notice: Subject to any disclaimer, the term of this patent is extended or adjusted under 35 U.S.C. 154(b) by 0 days.

(21) Appl. No.: 17/711,603

(22) Filed: Apr. 1, 2022

(65) Prior Publication Data

US 2022/0315672 A1 Oct. 6, 2022

(30) Foreign Application Priority Data

Apr. 2, 2021 (JP) ................. 2021-063768

(51) Int. Cl.
*C08C 19/22* (2006.01)
(52) U.S. Cl.
CPC .................... *C08C 19/22* (2013.01)
(58) Field of Classification Search
CPC .......... C08C 19/22; C08C 19/20; C08C 19/12
See application file for complete search history.

(56) References Cited

U.S. PATENT DOCUMENTS

| | | | | |
|---|---|---|---|---|
| 3,213,075 A | * | 10/1965 | Sonnenfeld | C08F 136/06 525/352 |
| 2009/0036608 A1 | * | 2/2009 | Ozoe | C09J 113/02 525/215 |
| 2017/0298026 A1 | * | 10/2017 | Tsanaktsidis | C08F 120/06 |
| 2021/0332206 A1 | | 10/2021 | Alexanian et al. | |

FOREIGN PATENT DOCUMENTS

WO  WO 2019/070889 A1  4/2019

OTHER PUBLICATIONS

Williamson et al., "Chemo- and Regioselective Functionalization of Isotactic Polypropylene: A Mechanistic and Structure-Property Study", Journal of the American Chemical Society, (United States of America), American Chemical Society, 2019, vol. 141, No. 32, pp. 12815-12823.

Williamson et al., "Regioselective C—H Xanthylation as a Platform for Polyolefin Functionalization", Angewandte Chemie International Edition, Germany, John Wiley & Sons (Wiley-VCH), 2018, vol. 57, pp. 6261-6265.

* cited by examiner

*Primary Examiner* — Robert C Boyle
(74) *Attorney, Agent, or Firm* — Birch, Stewart, Kolasch & Birch, LLP

(57) ABSTRACT

An object of the present invention is to provide a diene-based polymer that can control the crosslinking morphology. The present invention provides a modified diene-based polymer having a structure represented by the formula (1).

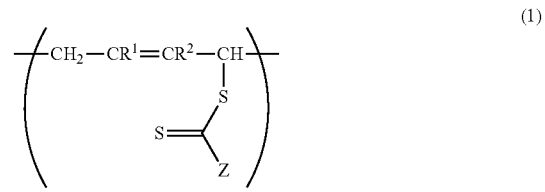

[In the formula (1), $R^1$ and $R^2$ represent an alkyl group having 1 or more carbon atoms, an aryl group having 6 or more carbon atoms, an aralkyl group having 6 or more carbon atoms, a hydrogen atom, or a halogen atom; and Z is an organic group, an organic group where a part of hydrogen atom of the above organic group is substituted, a hydrogen atom, or a halogen atom.]

14 Claims, 3 Drawing Sheets

MODIFIED DIENE-BASED POLYMER

FIELD OF THE INVENTION

The present invention relates to a modified diene-based polymer having a specific functional group introduced to a main chain.

DESCRIPTION OF THE RELATED ART

A diene-based polymer obtained by polymerizing a monomer composition containing a conjugated diene compound has a double bond in the molecular chain. Thus, the diene-based polymer is used as a material for forming a crosslinked structure. A crosslinked structure is formed by additional polymerization of a co-crosslinking agent to the double bond in the molecular chain of such diene-based polymer and formation of a graft chain. The crosslinking morphology of the diene-based polymer affects mechanical properties of the obtained crosslinked product (cured product). Thus, it has been proposed to further add an additive to the diene-based polymer and the co-crosslinking agent to change the crosslinking morphology and control the properties of the crosslinked product.

However, controlling the crosslinking morphology by the additive does not work effectively and uniformly for all the graft chains. In addition, non-graft chains lowering the crosslinking density or by-products by a side reaction are generated by the additive, which may become a factor lowering mechanical properties of the crosslinked product.

Thus, it has been proposed to introduce a functional group to the molecular chain of the polyolefin-based polymer to control the crosslinking morphology. For example, patent document 1 and non-patent documents 1 and 2 disclose a method of introducing a substituent group having a dithiocarbonyl group to an olefin-based polymer by irradiating or heating a photoactive amide compound to generate radicals.
Patent document 1: WO 2019/070889
Non-patent document 1: Jill B. Williamson et al, Regioselective C-H Xanthylation as a Platform for Polyolefin Functionalization, Angewandte Chemie International Edition, Germany, John Wiley & Sons (Wiley-VCH), 2018, Vol.57, p. 6261-6265); and
Non-patent document 2: Jill B. Williamson et al. Chemo- and Regioselective Functionalization of Isotactic Polypropylene: A Mechanistic and Structure-Property Study, Journal of the American Chemical Society, (United States of America), American Chemical Society, 2019, Vol.141, No. 32, p. 12815-12823

SUMMARY OF THE INVENTION

It is possible to control the crosslinking morphology by introducing the functional group to the molecular chain of the polyolefin-based polymer. However, if the functional group is introduced to the molecular chain of the diene-based polymer by the method disclosed in WO 2019/070889, a crosslinking is formed between the diene-based polymers when introducing the functional group. Thus, an adverse effect occurs when crosslinking the diene-based polymer having the functional group introduced with a co-crosslinking agent.

The present invention has been achieved in view of the above circumstances, and an object of the present invention is to provide a modified diene-based polymer that controls the crosslinking morphology.

The present invention that has solved the above problems provides a modified diene-based polymer having a structure represented by the formula (1).

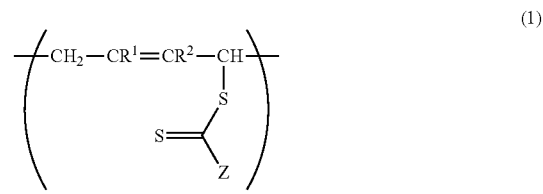

[In the formula (1), $R^1$ and $R^2$ represent an alkyl group having 1 or more carbon atoms, an aryl group having 6 or more carbon atoms, an aralkyl group having 6 or more carbon atoms, a hydrogen atom, or a halogen atom; and Z is an alkyl group, an alkenyl group, an alkynyl group, an aryl group, an aralkyl group, a heterocyclyl group, an alkoxy group, an aryloxy group, an aralkyloxy group, a heterocyclyloxy group, an alkanoyl group, an aroyl group, a heterocyclylcarbonyl group, an alkoxycarbonyl group, an aryloxycarbonyl group, a heterocyclyloxycarbonyl group, an alkanoyloxy group, an aroyloxy group, a heterocyclylcarbonyloxy group, a carbamoyl group, a carboxy group, an alkylthio group, an arylthio group, an amino group, a cyano group, a dialkylphosphonate group, a diarylphosphonate group, a dialkylphosphinate group, a diarylphosphinate group, an organic group where a part of hydrogen atom of the above organic groups is substituted, a hydrogen atom, or a halogen atom.]

The modified diene-based polymer according to the present invention has a substituent group having a dithioester structure introduced to a part of the molecular chain. Thus, it is considered that if this modified diene-based polymer is crosslinked with a co-crosslinking agent, a graft chain is easily formed at the part where the substituent group having the dithioester structure is introduced. Accordingly, using the modified diene-based polymer according to the present invention facilitates controlling the crosslinking morphology of the obtained crosslinked product.

According to the present invention, using the modified diene-based polymer facilitates controlling the crosslinking morphology of the obtained crosslinked product, thereby controlling mechanical properties of the crosslinked product.

DESCRIPTION OF THE PREFERRED EMBODIMENT

Figure 1:
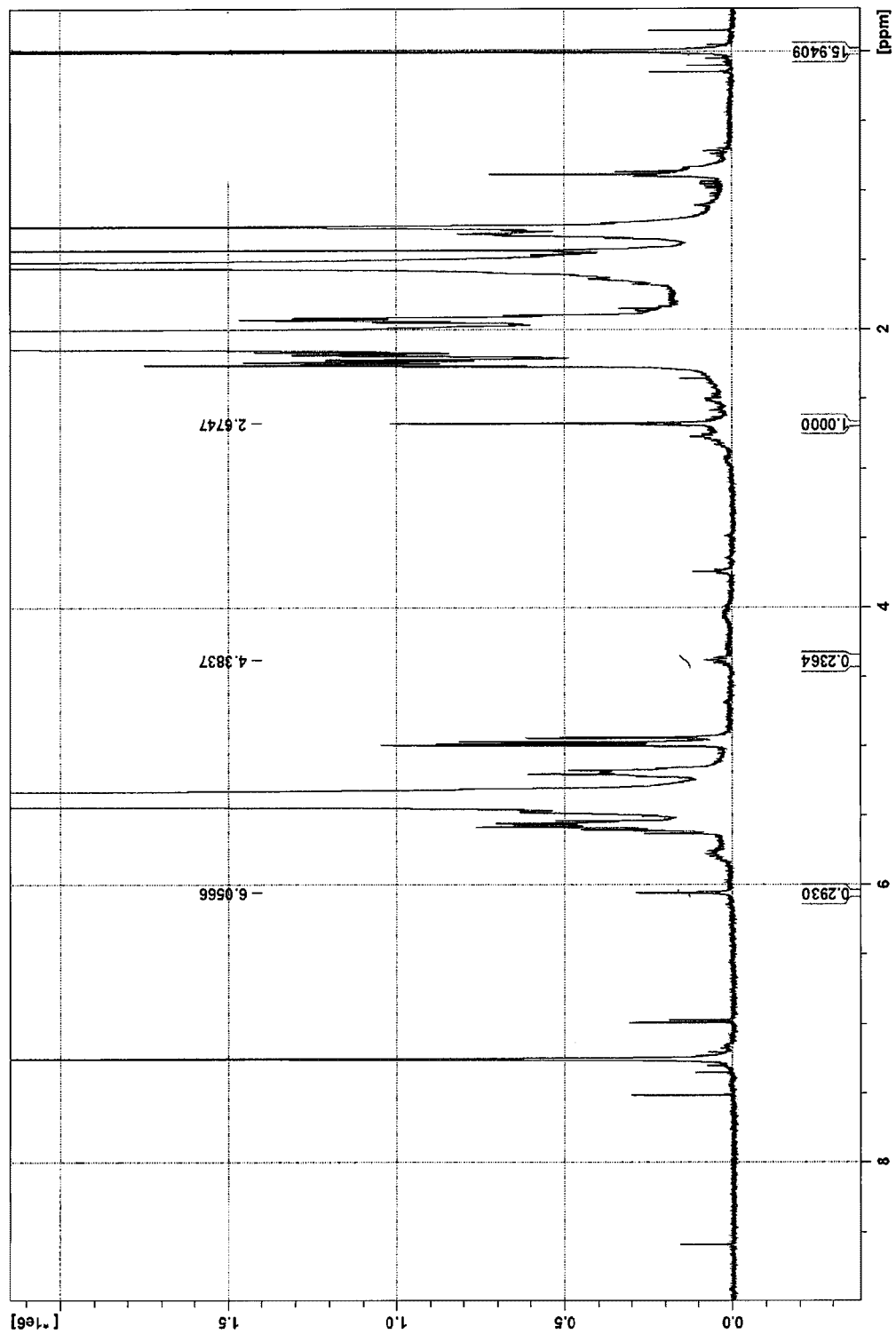
FIG. 1 is $^1$H-NMR spectrum of the modified diene-based polymer No. 1.

[Modified Diene-Based Polymer]
The present invention provides a modified diene-based polymer having a structure represented by the formula (1). The structure represented by the formula (1) may be one, or at least two.

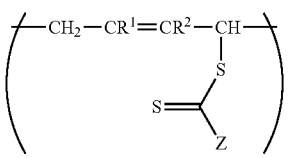

(1)

[In the formula (1), $R^1$ and $R^2$ represent an alkyl group having 1 or more carbon atoms, an aryl group having 6 or more carbon atoms, an aralkyl group having 6 or more carbon atoms, a hydrogen atom, or a halogen atom; and Z is an alkyl group, an alkenyl group, an alkynyl group, an aryl group, an aralkyl group, a heterocyclyl group, an alkoxy group, an aryloxy group, an aralkyloxy group, a heterocyclyloxy group, an alkanoyl group, an aroyl group, a heterocyclylcarbonyl group, an alkoxycarbonyl group, an aryloxycarbonyl group, a heterocyclyloxycarbonyl group, an alkanoyloxy group, an aroyloxy group, a heterocyclylcarbonyloxy group, a carbamoyl group, a carboxy group, an alkylthio group, an arylthio group, an amino group, a cyano group, a dialkylphosphonate group, a diarylphosphonate group, a dialkylphosphinate group, a diarylphosphinate group, an organic group where a part of hydrogen atom of the above organic groups is substituted, a hydrogen atom, or a halogen atom.]

Examples of the alkyl group having 1 or more carbon atoms represented by $R^1$ and $R^2$ include a linear alkyl group, a branched alkyl group, and a cyclic alkyl group. The alkyl group preferably has 18 or less carbon atoms, more preferably has 12 or less carbon atoms, and even more preferably has 6 or less carbon atoms. Examples of the linear alkyl group include a methyl group, an ethyl group, a n-propyl group, a n-butyl group, and a n-pentyl group. Examples of the branched alkyl group include an isopropyl group, an isobutyl group, and a t-butyl group. Examples of the cyclic alkyl group include a cyclopropyl group, a cyclobutyl group, a cyclopentyl group, and a cyclohexyl group.

The aryl group having 6 or more carbon atoms and optionally having a substituent group, represented by $R^1$ and $R^2$, includes a monocyclic aryl group, and a polycyclic aryl group. The aryl group preferably has 20 or less carbon atoms, more preferably has 14 or less carbon atoms. Examples of the aryl group include a phenyl group, and a naphthyl group. It is noted that the hydrogen atom of the aryl group is optionally substituted with an alkyl group, an alkenyl group, an alkynyl group, an aryl group, an aralkyl group, or a halogen atom.

The aralkyl group having 6 or more carbon atoms and optionally having a substituent group, represented by $R^1$ and $R^2$, preferably has 20 or less carbon atoms, more preferably has 14 or less carbon atoms. The aralkyl group is a group where at least one hydrogen atom of an alkyl group is substituted with an aryl group. The aryl group included in the aralkyl group includes a monocyclic aryl group, and a polycyclic aryl group. The alkylene group included in the aralkyl group may be linear or branched. Examples of the aralkyl group include a benzyl group, a phenylethyl group, a phenylpropyl group, a phenylbutyl group, an α-cumyl group, and a 1-phenylethyl group. It is noted that the hydrogen atom of the aryl group included in the aralkyl group is optionally substituted with an alkyl group, an alkenyl group, an alkynyl group, an aryl group, an aralkyl group, ora halogen atom.

Examples of the halogen atom represented by $R^1$ and $R^2$ include a fluorine atom, a chlorine atom, a bromine atom, and an iodine atom.

In the formula (1), $R^1$ and $R^2$ are preferably a hydrogen atom, a halogen atom, or an alkyl group having 1 to 18 carbon atoms, particularly preferably a hydrogen atom, a methyl group, an ethyl group, a n-propyl group, an isopropyl group, a n-butyl group, a s-butyl group, or a t-butyl group.

Examples of the organic group represented by Z include the following groups.

The alkyl group includes a linear alkyl group, a branched alkyl group, and a cyclic alkyl group. The alkyl group preferably has 18 or less carbon atoms. Examples of the alkyl group include a methyl group, an ethyl group, a propyl group, an isopropyl group, a butyl group, a t-butyl group, a dodecyl group, a cyclopentyl group, and a cyclohexyl group.

The alkenyl group includes a linear alkenyl group, a branched alkenyl group, and a cyclic alkenyl group. The alkenyl group preferably has 18 or less carbon atoms. Examples of the alkenyl group include a vinyl group, a propenyl group, a butenyl group, and a pentenyl group.

The alkynyl group includes a linear alkynyl group, a branched alkynyl group, and a cyclic alkynyl group. The alkynyl group preferably has 18 or less carbon atoms. Examples of the alkynyl group include an ethynyl group, a propynyl group, a butynyl group, and a pentynyl group.

The aryl group includes a monocyclic aryl group, and a polycyclic aryl group. The aryl group preferably has 20 or less carbon atoms. Examples of the aryl group include a phenyl group, and a naphthyl group.

The aryl group included in the aralkyl group includes a monocyclic aryl group, and a polycyclic aryl group. The aralkyl group preferably has 20 or less carbon atoms. Examples of the aralkyl group include a benzyl group, a phenylethyl group, a phenylpropyl group, a phenylbutyl group, an α-cumyl group, and a 1-phenylethyl group.

The heterocyclyl group is a group where one hydrogen atom is removed from any one of ring atoms of a heterocyclic compound. The heterocyclic compound is a cyclic compound having a carbon atom and an atom other than a carbon atom as the ring atom, and is preferably a 4-membered ring to a 7-membered ring. The atom constituting the heterocyclic compound other than a carbon atom is preferably at least one member selected from the group consisting of a nitrogen atom, an oxygen atom and a sulfur atom. Examples of the heterocyclyl group include a pyrrolidyl group, a piperidyl group, a pyrrolyl group, a pyridyl group, a tetrahydrofuryl group, a tetrahydropyranyl group, a furyl group, a tetrahydrothienyl group, a tetrahydrothiopyranyl group, a thienyl group, an imidazolidinyl group, an imidazolylyl group, an imidazolyl group, a pyrazolyl group, an oxazolidinyl group, an oxazolyl group, a thiazolidinyl group, a thiazolyl group, a piperazyl group, a morpholyl group, a pyridazinyl group, a pyrimidinyl group, a pyrazinyl group, a quinolyl group, an isoquinolyl group, and a quinazolinyl group.

The alkoxy group preferably has 18 or less carbon atoms. Examples of the alkoxy group include a methoxy group, an ethoxy group, a propoxy group, and a butoxy group.

The aryloxy group preferably has 20 or less carbon atoms. Examples of the aryloxy group include a phenoxy group.

The aralkyloxy group preferably has 20 or less carbon atoms. Examples of the aralkyloxy group include an α-cumyloxy group.

Examples of the heterocyclyloxy group include a pyrrolyloxy group, a pyridyloxy group, and a pyrimidinyloxy group.

The alkanoyl group preferably has 18 or less carbon atoms. Examples of the alkanoyl group include a formyl group, an acetyl group, a propionyl group, and a butyryl group.

The aroyl group preferably has 20 or less carbon atoms. Examples the aroyl group include a benzoyl group, and a naphthoyl group.

Examples of the heterocyclylcarbonyl group include a pyrrolylcarbonyl group, a pyridylcarbonyl group, and a pyrimidylcarbonyl group.

The alkoxycarbonyl group preferably has 19 or less carbon atoms. Example of the alkoxycarbonyl group include a methoxycarbonyl group, an ethoxy carbonyl group, and a propoxycarbonyl group.

The aryloxycarbonyl group preferably has 21 or less carbon atoms. Example of the aryloxycarbonyl group include a phenoxycarbonyl group.

Examples of the heterocyclyloxycarbonyl group include a pyrrolyloxycarbonyl group, a pyridyloxycarbonyl group, and a pyrimidinyloxycarbonyl group.

The alkanoyloxy group preferably has 18 or less carbon atoms. Example of the alkanoyloxy group include an acetyloxy group, and a propionyloxy group.

The aroyloxy group preferably has 20 or less carbon atoms. Example of the aroyloxy group include a benzoyloxy group, and a 1-naphthoyl oxy group.

Examples of the heterocyclylcarbonyloxy group include a pyrrolylcarbonyloxy group, a pyridylcarbonyloxy group, and a pyrimidinylcarbonyloxy group.

The alkylthio group preferably has 18 or less carbon atoms. Examples of the alkylthio group include a methylthio group, an ethylthio group, a propylthio group, and a dodecylthio group.

The arylthio group preferably has 20 or less carbon atoms. Examples of the arylthio group include a phenylthio group.

Examples of the substituent group of a part of the hydrogen atom of the above organic groups include an alkyl group, an alkenyl group, an alkynyl group, an aryl group, an aralkyl group, a heterocyclyl group, an alkoxy group, an aryloxy group, an aralkyloxy group, a heterocyclyloxy group, an alkanoyl group, an aroyl group, a heterocyclylcarbonyl group, an alkoxycarbonyl group, an aryloxycarbonyl group, a heterocyclyloxycarbonyl group, an alkanoyloxy group, an aroyloxy group, a heterocyclylcarbonyloxy group, a carbamoyl group, a carboxy group, an alkylthio group, an arylthio group, an amino group, a cyano group, an oxo group, and a halogen atom.

Examples of the organic group having the substituent group include a cyanoalkyl group, a halogenated alkyl group, and an alkylamino group, and specific examples thereof include an oxopyrrolidine-1-yl group, a methylphenylamino group, a methylpyridylamino group, a 3,5-dimethylpyrazolyl group, a 4-chloro-3,5-dimethylpyrazolyl group, a cyanomethyl group, a 2-cyanobutane-2-yl group, a 1-cyanoethane-1-yl group, a 2-cyanopropane-2-yl group, a 2-phenylpropane-2-yl group, a 1-cyano-1-phenylethane-1-yl group, and a 2-(ethoxycarbonyl)propane-2-yl group.

Examples of the halogen atom include a fluorine atom, a chlorine atom, a bromine atom, and an iodine atom.

In the formula (1), Z is preferably an alkyl group having 1 to 18 carbon atoms, an alkoxy group having 1 to 18 carbon atoms, an aryloxy group having 6 to 20 carbon atoms, or a structure represented by any one of the formulae (11) to (16).

(11)

(12)

(13)

(14)

(15)

(16)

[In the formulae (11) to (16), $R^{11}$ to $R^{16}$ represent an alkyl group having 1 to 18 carbon atoms, an aryl group having 6 to 20 carbon atoms, an aralkyl group having 6 to 20 carbon atoms, a hydrogen atom, or a halogen atom.]

In particular, the structure represented by the formula (1) is preferably a structure represented by the formula (1-1). If the Z moiety in the formula (1) has the pyrazole ring, the crosslinking controllability is enhanced when using the modified diene-based polymer to form the crosslinked structure.

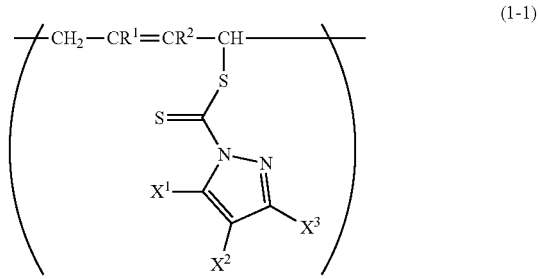

(1-1)

[In the formula (1-1), $R^1$ and $R^2$ represent an alkyl group having 1 or more carbon atoms, an aryl group having 6 or more carbon atoms, an aralkyl group having 6 or more carbon atoms, a hydrogen atom, or a halogen atom; and $X^1$, $X^2$ and $X^3$ represent an alkyl group having 1 or more carbon atoms, an aryl group having 6 or more carbon atoms, an aralkyl group having 6 or more carbon atoms, a hydrogen atom, or a halogen atom.]

Special examples of $R^1$ and $R^2$ in the formula (1-1) include those exemplified as the special examples of $R^1$ and $R^2$ in the formula (1). In addition, $R^1$ and $R^2$ in the formula (1-1) is preferably a hydrogen atom, a halogen atom, or an alkyl group having 1 to 18 carbon atoms, particularly a hydrogen atom, a methyl group, an ethyl group, a n-propyl group, an isopropyl group, a n-butyl group, a s-butyl group, or a t-butyl group.

The alkyl group having 1 or more carbon atoms represented by $X^1$ to $X^3$ in the formula (1-1) includes a linear alkyl group, a branched alkyl group, and a cyclic alkyl group. The alkyl group having 1 or more carbon atoms preferably has 18 or less carbon atoms, more preferably has 12 or less carbon atoms, and even more preferably has 4 or less carbon atoms. Examples of the alkyl group include a methyl group, an ethyl group, a propyl group, an isopropyl group, a butyl group, a t-butyl group, a dodecyl group, a cyclopentyl group, and a cyclohexyl group.

The aryl group having 6 or more carbon atoms represented by $X^1$ to $X^3$ in the formula (1-1) includes a monocyclic aryl group, and a polycyclic aryl group. The aryl group having 6 or more carbon atoms preferably has 20 or less carbon atoms, more preferably has 14 or less carbon atoms. Examples of the aryl group include a phenyl group, and a naphthyl group.

The aryl group included in the aralkyl group having 6 or more carbon atoms represented by $X^1$ to $X^3$ in the formula (1-1) includes a monocyclic aryl group, and a polycyclic aryl group. The aralkyl group having 6 or more carbon atoms preferably has 20 or less carbon atoms, more preferably has 15 or less carbon atoms. Examples of the aralkyl group include a benzyl group, a phenylethyl group, a phenylpropyl group, a phenylbutyl group, an α-cumyl group, and a 1-phenylethyl group.

$X^1$ to $X^3$ in the formula (1-1) are preferably an alkyl group having 1 to 4 carbon atoms, or a hydrogen atom.

The amount of the structure represented by the formula (1) in the modified diene-based polymer is suitably adjusted depending on the desired crosslinking morphology. In case of forming an elastic material from a polymer composition containing the modified diene-based polymer, the amount of the structure represented by the formula (1) in the modified diene-based polymer is preferably 0.01 mass % or more, more preferably 0.02 mass % or more, and even more preferably 0.05 mass % or more, and is preferably 100 mass % or less, more preferably 80 mass % or less, and even more preferably 50 mass % or less.

(Other Component)

The modified diene-based polymer preferably has a structure represented by the formula (2). The modified diene-based polymer may include one kind of the structure represented by the formula (2) or at least two kinds of the structures represented by the formula (2).

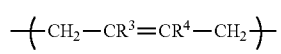

(2)

[In the formula (2), $R^3$ and $R^4$ represent an alkyl group having 1 or more carbon atoms, an aryl group having 6 or more carbon atoms, an aralkyl group having 6 or more carbon atoms, a hydrogen atom, or a halogen atom.]

Special examples of $R^3$ and $R^4$ in the formula (2) include those exemplified as the special examples of $R^1$ and $R^2$ in the formula (1). In addition, $R^3$ and $R^4$ in the formula (2) are preferably a hydrogen atom, a halogen atom or an alkyl group having 1 to 18 carbon atoms, particularly preferably a hydrogen atom, a methyl group, an ethyl group, a n-propyl group, an isopropyl group, a n-butyl group, a s-butyl group, or a t-butyl group.

The modified diene-based polymer may have a structure deriving from other vinyl monomers, in addition to the structure represented by the formula (1) and the structure represented by the formula (2). Examples of other vinyl monomers include an aromatic vinyl monomer such as styrene, a (meth)acrylic monomer such as acrylonitrile, and an alkene such as isobutene.

The total amount of the structure represented by the formula (1) and the structure represented by the formula (2) in the modified diene-based polymer is preferably 0.01 mass % or more, more preferably 0.02 mass % or more, even more preferably 0.05 mass % or more, further even more 50 mass % or more, and particularly preferably 80 mass % or more. The modified diene-based polymer may consist of the structure represented by the formula (1) and the structure represented by the formula (2).

The modified diene-based polymer preferably has an absorption peak (maximum value) in a wavelength range from 350 nm to 600 nm (more preferably 380 nm to 500 nm) in an ultraviolet-visible light absorption spectrum. It is considered that the peak appearing in this wavelength region is attributed to the substituent group introduced to the diene-based polymer. If the absorption peak appears in this wavelength region, controlling of the reaction when synthesizing the modified diene-based polymer become easier, and forming of the crosslinked structure in the obtained modified diene-based polymer is suppressed.

The modified diene-based polymer preferably has no crosslinked structure formed between the molecular chains. The presence or absence of the crosslinked structure is evaluated by performing a swelling experiment using toluene as a solvent, and calculating the network chain density using Flory-Rehner equation from the result of the swelling experiment. The network chain density of the modified diene-based polymer is preferably 0.05 mmol/cm$^3$ or less, more preferably 0.02 mmol/cm$^3$ or less, and even more preferably 0.01 mmol/cm$^3$ or less. If the network chain density is 0.05 mmol/cm$^3$ or less, the modified diene-based polymer has the same degree of processibility as an unmodified diene-based polymer.

[Production Method of Modified Diene-Based Polymer]

The modified diene-based polymer is produced by introducing a functional group having a dithioester structure to a diene-based polymer. The functional group having the dithioester structure can be introduced by a reaction of a diene-based polymer and a dithioester compound. The method of the reaction of the diene-based polymer and the dithioester compound is preferably, but not particularly limited to, a method of irradiating a ray to a mixture of the diene-based polymer and the dithioester compound.

The production method of the modified diene-based polymer preferably comprises a first step of mixing a diene-based polymer and a dithioester compound to prepare a mixture; and a second step of irradiating a ray to the mixture under an inert atmosphere. Performing the reaction between the diene-based polymer and the dithioester compound using the ray suppresses the crosslink-forming between the molecular chains in the obtained modified diene-based polymer.

(First Step)

In the first step, the diene-based polymer and the dithioester compound are mixed such that the dithioester compound is uniformly dispersed in the diene-based polymer, to prepare the mixture thereof.

Examples of the diene-based polymer include a polymer formed from one conjugated diene monomer, a copolymer formed from two or more conjugated diene monomers, and a copolymer formed from a conjugated diene monomer and another vinyl monomer.

The conjugated diene monomer is preferably a compound represented by the formula (3).

$$CH_2=CR^5-CR^6=CH_2 \quad (3)$$

[In the formula (3), $R^5$ and $R^6$ represent an alkyl group having 1 or more carbon atoms, an aryl group having 6 or more carbon atoms, an aralkyl group having 6 or more carbon atoms, a hydrogen atom, or a halogen atom.]

Special examples of $R^5$ and $R^6$ in the formula (3) include those exemplified as the special examples of $R^1$ and $R^2$ in the formula (1). In addition, $R^5$ and $R^6$ in the formula (3) is preferably a hydrogen atom, a halogen atom or an alkyl group having 1 to 18 carbon atoms, particularly preferably a hydrogen atom, a methyl group, an ethyl group, a n-propyl group, an isopropyl group, a n-butyl group, a s-butyl group, or a t-butyl group.

The conjugated diene monomer is preferably 1,4-butadiene, 1,2-butadiene, isoprene, or chloroprene.

Examples of other vinyl monomers include an aromatic vinyl monomer such as styrene, a (meth)acrylic monomer such as acrylonitrile, and an alkene such as isobutene.

Examples of the diene-based polymer include polybutadiene, polyisoprene, polychloroprene, an acrylonitrile-butadiene copolymer, a styrene-butadiene copolymer, a styrene-isoprene copolymer, a butadiene-isoprene copolymer, and an isobutene-isoprene copolymer.

The diene-based polymer is preferably a high-cis polybutadiene having cis-1,4-bond in an amount of 40 mass % or more, preferably 80 mass % or more, more preferably 90 mass % or more. If the high-cis polybutadiene having the high amount of cis-1,4-bond is used, the obtained crosslinked product has high resilience performance. The amount of 1,2-vinyl bond in the high-cis polybutadiene is preferably 2.0 mass % or less, more preferably 1.7 mass % or less, and even more preferably 1.5 mass % or less. If the amount of 1,2-vinyl bond is smaller, the obtained crosslinked product has higher resilience performance.

The high-cis polybutadiene is preferably one synthesized using a rare-earth element catalyst. When a neodymium catalyst employing a neodymium compound which is a lanthanum series rare-earth element compound, is used, a polybutadiene rubber having a high amount of cis-1,4 bond and a low amount of 1,2-vinyl bond is obtained with an excellent polymerization activity, and thus such polybutadiene rubber is particularly preferable.

The dithioester compound is preferably a compound represented by the formula (4), or a compound represented by the formula (5).

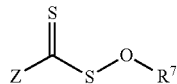
(4)

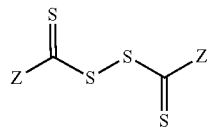
(5)

[In the formulae (4) and (5), Z is an alkyl group, an alkenyl group, an alkynyl group, an aryl group, an aralkyl group, a heterocyclyl group, an alkoxy group, an aryloxy group, an aralkyloxy group, a heterocyclyloxy group, an alkanoyl group, an aroyl group, a heterocyclylcarbonyl group, an alkoxycarbonyl group, an aryloxycarbonyl group, a heterocyclyloxycarbonyl group, an alkanoyloxy group, an aroyloxy group, a heterocyclylcarbonyloxy group, a carbamoyl group, a carboxy group, an alkylthio group, an arylthio group, an amino group, a cyano group, a dialkylphosphonate group, a diarylphosphonate group, a dialkylphosphinate group, a diarylphosphinate group, an organic group where a part of hydrogen atom of the above organic groups is substituted, a hydrogen atom, or a halogen atom; and $R^7$ represents a monovalent hydrocarbon group optionally having a substituent group.]

Special examples of Z in the formulae (4) and (5) include those exemplified as the special examples of Z in the formula (1). Z in the formulae (4) and (5) is preferably an alkyl group having 1 to 18 carbon atoms, an alkoxy group having 1 to 18 carbon atoms, an aryloxy group having 6 to 20 carbon atoms, or a structure represented by any one of formulae (11) to (16).

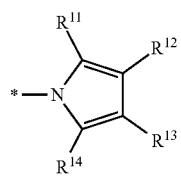
(11)

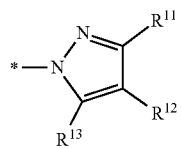
(12)

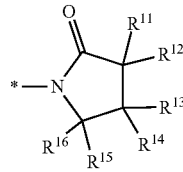
(13)

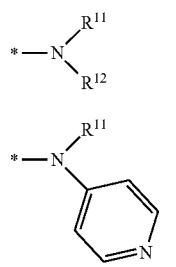
(14)

(15)

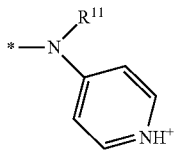

(16)

[In the formulae (11) to (16), $R^{11}$ to $R^{16}$ represent an alkyl group having 1 to 18 carbon atoms, an aryl group having 6 to 20 carbon atoms, an aralkyl group having 6 to 20 carbon atoms, a hydrogen atom, or a halogen atom.]

$R^7$ in the formula (4) is preferably an alkyl group, an aralkyl group, an aryl group, an alkenyl group, an alkynyl group, a carbonyl group, a carboxyl group, a group where a part of hydrogen atom of the above hydrocarbon groups is substituted, or a halogen atom.

$R^7$ in the formula (4) is preferably a structure represented by the formula (6). If $R^7$ is the structure represented by the formula (6), the R radical (R) generated from the dithioester compound effectively captures the polymer radical, which further suppresses the crosslinking of the polymer chains.

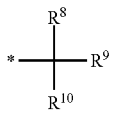

(6)

[In the formula (6), $R^8$, $R^9$ and $R^{19}$ each independently represent an alkyl group having 1 or more carbon atoms, an alkenyl group having 2 or more carbon atoms, an alkynyl group having 2 or more carbon atoms, an aryl group having 6 or more carbon atoms with an optional substituent group, an aralkyl group having 6 or more carbon atoms with an optional substituent group, a hydrogen atom, or a halogen atom.]

The alkyl group includes a linear alkyl group, a branched alkyl group, and a cyclic alkyl group. The alkyl group preferably has 18 or less carbon atoms. Examples of the alkyl group include a methyl group, an ethyl group, a propyl group, an isopropyl group, a butyl group, a t-butyl group, a dodecyl group, a cyclopentyl group, and a cyclohexyl group.

The alkenyl group includes a linear alkenyl group, a branched alkenyl group, and a cyclic alkenyl group. The alkenyl group preferably has 18 or less carbon atoms. Examples of the alkenyl group include a vinyl group, a propenyl group, a butenyl group, and a pentenyl group.

The alkynyl group includes a linear alkynyl group, a branched alkynyl group, and a cyclic alkynyl group. The alkynyl group preferably has 18 or less carbon atoms. Examples of the alkynyl group include an ethynyl group, a propynyl group, a butynyl group, and a pentynyl group.

The aryl group included in the aralkyl group includes a monocyclic aryl group, and a polycyclic aryl group. The aralkyl group preferably has 20 or less carbon atoms. Examples of the aralkyl group include a benzyl group, a phenylethyl group, a phenylpropyl group, a phenylbutyl group, an α-cumyl group, and a 1-phenylethyl group.

The aryl group includes a monocyclic aryl group, and a polycyclic aryl group. The aryl group preferably has 20 or less carbon atoms. Examples of the aryl group include a phenyl group, and a naphthyl group.

Examples of the halogen atom include a fluorine atom, a chlorine atom, a bromine atom, and an iodine atom.

Examples of the substituent group of $R^7$ include an amino group, a cyano group, an oxo group, and a halogen atom.

$R^7$ is preferably an alkyl group having 1 to 18 carbon atoms, or an aralkyl group having 1 to 20 carbon atoms, more preferably a t-butyl group, an α-cumyl group, a t-octyl group, or a benzyl group.

The compound represented by the formula (4) or (5) is particularly preferably a compound represented by the formula (4-1) or (5-1). If the Z moiety in the formula (1) has the pyrazole ring, the modified diene-based polymer is effectively synthesized.

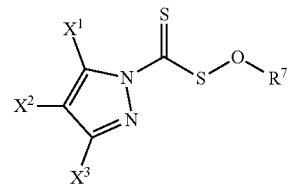

(4-1)

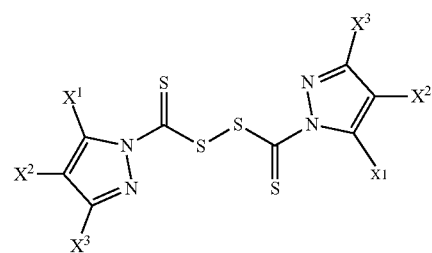

(5-1)

[In the formulae (4-1) and (5-1), $X^1$, $X^2$ and $X^3$ represent an alkyl group having 1 or more carbon atoms, an aryl group having 6 or more carbon atoms, an aralkyl group having 6 or more carbon atoms, a hydrogen atom, or a halogen atom; and $R^7$ represents a monovalent hydrocarbon group with an optional substituent group.]

Special examples of $X^1$ to $X^3$ in the formulae (4-1) and (5-1) include those exemplified as the special examples of $X^1$ to $X^3$ in the formula (1-1). In addition, $X^1$ to $X^3$ in the formulae (4-1) and (5-1) are preferably an alkyl group having 1 to 4 carbon atoms, or a hydrogen atom.

Special examples of $R^7$ in the formula (4-1) include those exemplified as the special examples of $R^7$ in the formula (4). In addition, $R^7$ in the formula (4-1) is preferably an alkyl group having 1 to 18 carbon atoms, or an aralkyl group having 1 to 20 carbon atoms, more preferably a t-butyl group, an α-cumyl group, a t-octyl group, or a benzyl group.

The amount of the dithioester compound is suitably adjusted depending on the desired crosslinking morphology. In case of forming an elastic material from a polymer composition containing the modified diene-based polymer, the amount of the dithioester compound is preferably 0.01 part by mass or more, more preferably 0.05 part by mass or more, and even more preferably 0.1 part by mass or more, and is preferably 600 parts by mass or less, more preferably 480 parts by mass or less, and even more preferably 300 parts by mass or less, with respect to 100 parts by mass of the diene-based polymer.

The method for mixing the diene-based polymer and the dithioester compound is not particularly limited. For example, a conventional kneading machine such as a kneading roll, a Banbury mixer, and a kneader is used to perform the mixing.

(Second Step)

In the second step, a ray is irradiated to the mixture under an inert atmosphere to cause a reaction between the diene-based polymer and the dithioester compound, thereby introducing the functional group having the dithioester structure to the molecular chain of the diene-based polymer.

Examples of the inert atmosphere include a nitrogen atmosphere, and a rare gas atmosphere such as argon.

The type of the ray irradiated to the mixture and the irradiation time are not particularly limited, as long as they cause a reaction between the diene-based polymer and the dithioester compound. For example, a ray having a wavelength from 250 nm to 600 nm is used, and the irradiation time is from 1 minute to 120 hours.

Examples of the embodiment of irradiating the ray to the mixture include an embodiment of molding the mixture into a sheet shape and irradiating the ray to this sheet; and an embodiment of irradiating the ray to the mixture while the mixture is being kneaded.

The modified diene-based polymer having the functional group having the dithioester structure introduced to the diene-based polymer is obtained by irradiating the ray for a predetermined time. It is noted that the obtained modified diene-based polymer is preferably washed with an organic solvent to remove the unreacted dithioester compound.

EXAMPLES

Next, the present invention will be described in detail by way of examples. However, the present invention is not limited to the examples described below. Various changes and modifications without departing from the spirit of the present invention are included in the scope of the present invention.

[Evaluation Method]
1. $^1$HNMR (Nuclear Magnetic Resonance) Measurement

A nuclear magnetic resonance (NMR) measuring apparatus (frequency: 400 MHz) was used to perform the measurement of $^1$HNMR. CDCl$_3$ was used as the solvent.

2. Infrared Spectrophotometry (IR)

A Fourier transform infrared spectrophotometer (FT-IR) was used to perform the measurement of IR. Attenuated total reflection method (ATR method) was used as the measuring method to perform the measurement.

3. Ultraviolet-Visible Light Spectrophotometry (UV-VIS)

An ultraviolet-visible light spectrophotometer (UV-VIS) was used to perform the measurement of UV-VIS diffusion transmittance. The measurement was performed using integrating sphere.

4. Chloroform Dissolving Experiment

About 100 mg of sample and about 5 ml of chloroform were added in a vial and placed for one day, and dissolving of the sample was visually evaluated.

5. Network Chain Density Measurement

About 100 mg of sample and about 5 ml of toluene were added in a vial and placed at the temperature of 40° C. for two days. In the case that the sample was swollen without being dissolved, the sample was discharged from the vial, the mass of the swollen sample was measured, and the network chain density thereof was calculated using Flory-Rehner equation based on the masses of the sample before and after the swelling. In the case that the sample was completely dissolved, the network chain density thereof was deemed as less than 0.01 mmol/cm$^3$.

$$v(\text{mmol/cm}^3) = \frac{V_R + \ln(1 - V_R) + \mu V_R^2}{-V_0\left(V_R^{1/3} - \frac{V_R}{2}\right)} \times 10^3$$

v: network chain density $V_0$: molar volume of solvent (toluene) (108.15 cm$^3$/mol)

μ: interaction coefficient of polybutadiene and solvent (toluene) (0.49)

$$V_R = \frac{V_{Sample}}{V_{Sample} + V_T}$$

$$V_T = \frac{W_S - W_F}{\rho_T}$$

$V_{sample}$: volume of sample before swelling $V_T$: volume of toluene absorbed by swelling $W_F$: mass of sample before swelling $W_S$: mass of sample after swelling $\rho_T$: density of toluene (40° C.) (0.8507 g/cm$^3$)

[Preparation of Dithioester Compound]

(Dithioester Compound No. 1)

In a one-necked flask equipped with a stirrer and having a volume of 100 mL, 1.86 g (20.0 mmol) of 3,5-dimethylpyrazole was weighed, 30.0 mL of tetrahydrofuran was added, 1.16 g (20.6 mmol) of powdered potassium hydroxide was further added, and the mixture was stirred to obtain a light yellow solution.

Next, while this solution was being stirred, 1.98 g (26.0 mmol) of carbon disulfide was added dropwise therein. One hour later after the dropwise addition was completed, a Kiriyama funnel was used for the filtration of the sedimented precipitate. The filtrated product was washed with diethylether, and dried under reduced pressure at the temperature of 50° C. to obtain potassium 3,5-dimethyl-1H-pyrazole-1-dithiocarboxylate represented by the formula (7).

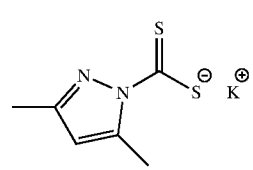

(7)

In a one-necked flask (100 mL) equipped with a stirrer, 860 mg (2.00 mmol) of [bis(trifluoroacetoxy)iodo]benzene was weighed under a nitrogen atmosphere. Subsequently, 4.0 mL of α-cumyl alcohol was added in this flask and stirred to obtain a light yellow solution. Next, 438 mg (2.00 mmol) of potassium 3,5-dimethyl-1H-pyrazole-1-dithiocarboxylate was added in this light yellow solution, and stirred at room temperature for 16.5 hours. A predetermined time later, the reaction liquid was concentrated under reduced pressure. The obtained concentrated liquid was purified by silica gel column chromatography to obtain 24.5 mg of the dithioester compound No. 1 represented by the formula (8).

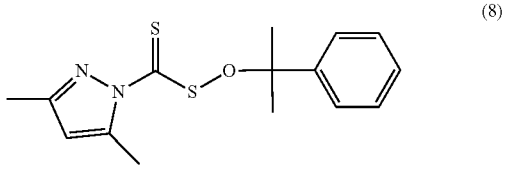 [SMILES: Cc1cc(C)n(C(=S)SOC(C)(C)c2ccccc2)n1]

(8)

(Dithioester Compound No. 2)

As the dithioester compound No. 2, a compound represented by the formula (9) (available from Sigma-Aldrich) was used.

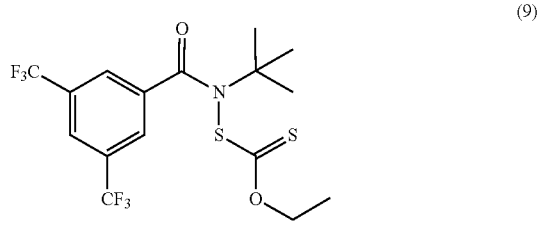 [SMILES: CCOC(=S)SN(C(=O)c1cc(C(F)(F)F)cc(C(F)(F)F)c1)C(C)(C)C]

(9)

[Production of Modified Diene-Based Polymer]

(Modified Diene-Based Polymer No. 1)

A biaxial roll was used to mix 40.36 g of a polybutadiene rubber (BR730 available from JSR Corporation) and 1.23 g of the dithioester compound No. 1 obtained above, and the mixture was discharged from the roll in a sheet shape with a thickness of 2 mm or less. The discharged sheet-shaped mixture was cut into sheet pieces with a length of about 75 mm and a width of about 15 mm.

Next, two pillars were set in a glove box purged with argon, and a horizontal bar was bridged therebetween horizontally to the ground. The sheet piece was hung on this horizontal bar using a thread. Further, two light sources ("A 160 WE Tuna Blue" available from Kessil Corporation, wavelength of ray: 380 nm to 500 nm) were set to sandwich the sheet piece therebetween such that both surfaces of the sheet piece were irradiated with the ray. It is noted that the sheet piece was set separately from the light sources at a distance of about 15 cm to 20 cm. The light sources were used to irradiate the ray to the sheet piece for 480 minutes to cause a reaction between the polybutadiene rubber and the dithioester compound No. 1. After the reaction was completed, the sheet piece was washed with an organic solvent (mixed solvent of acetone:tetrahydrofuran=1:2) to remove the unreacted reactant, and the modified diene-based polymer No. 1 was obtained.

(Modified Diene-Based Polymer No. 2)

A biaxial roll was used to mix 40.36 g of a polybutadiene rubber (BR730 available from JSR Corporation) and 1.72 g of the dithioester compound No. 2, and the mixture was discharged from the roll in a sheet shape with a thickness of 2 mm or less. The discharged sheet-shaped mixture was cut into sheet pieces with a length of about 75 mm and a width of about 15 mm.

Next, two pillars were set in a glove box purged with argon, and a horizontal bar was bridged therebetween horizontally to the ground. The sheet piece was hung on this horizontal bar using a thread. Further, two light sources ("A 160 WE Tuna Blue" available from Kessil Corporation, wavelength of ray: 380 nm to 500 nm) were set to sandwich the sheet piece therebetween such that both surfaces of the sheet piece were irradiated with the ray. It is noted that the sheet piece was set separately from the light sources at a distance of about 15 cm to 20 cm. The light sources were used to irradiate the ray to the sheet piece for 480 minutes to cause a reaction between the polybutadiene rubber and the dithioester compound No. 2. After the reaction was completed, the sheet piece was washed with an organic solvent (mixed solvent of acetone:tetrahydrofuran=1:2) to remove the unreacted reactant, and the modified diene-based polymer No. 2 was obtained.

[Evaluation]

Figure 2:
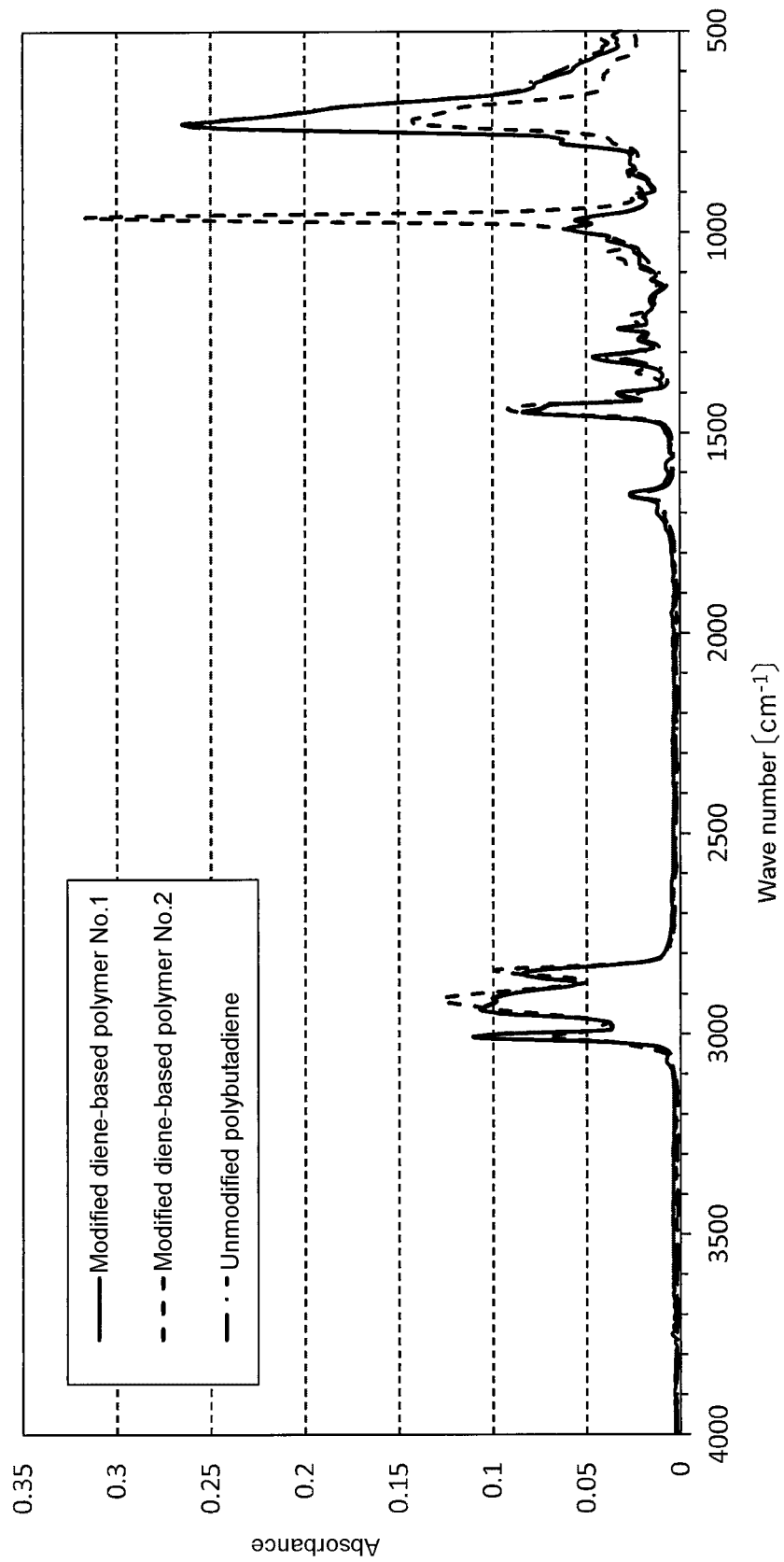
FIG. 2 is IR spectrum of the modified diene-based polymers No. 1, 2 and the unmodified polybutadiene.
Figure 3:
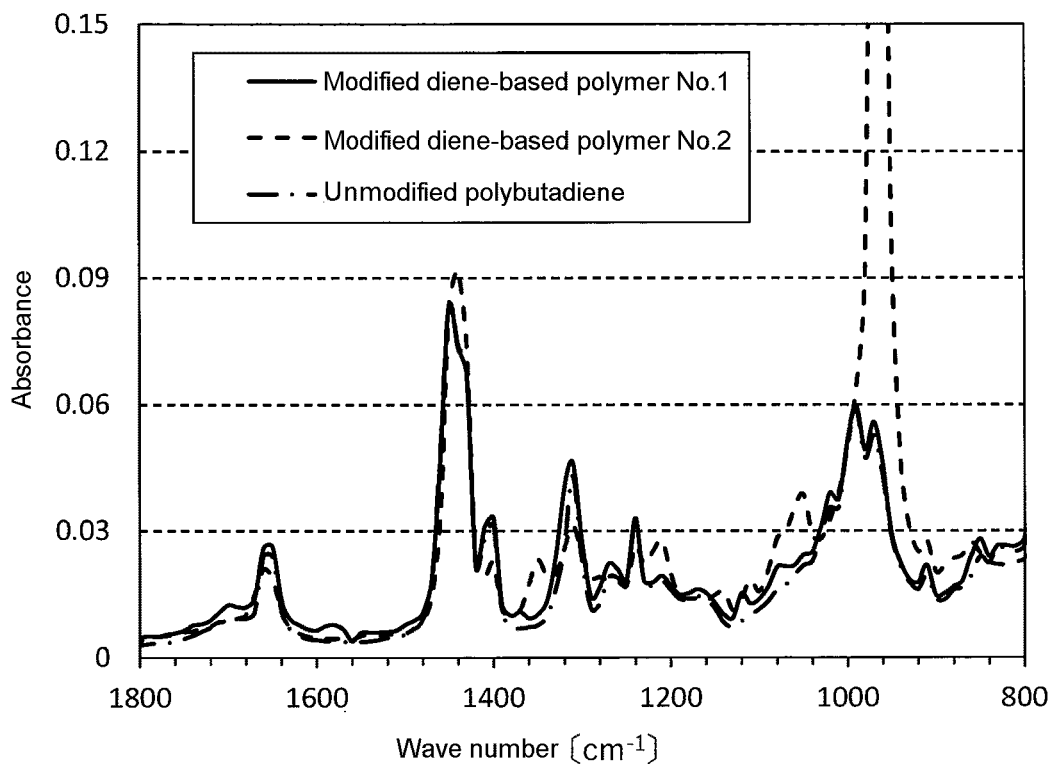
FIG. 3 is IR spectrum of the modified diene-based polymers No. 1, 2 and the unmodified polybutadiene.
Figure 4:
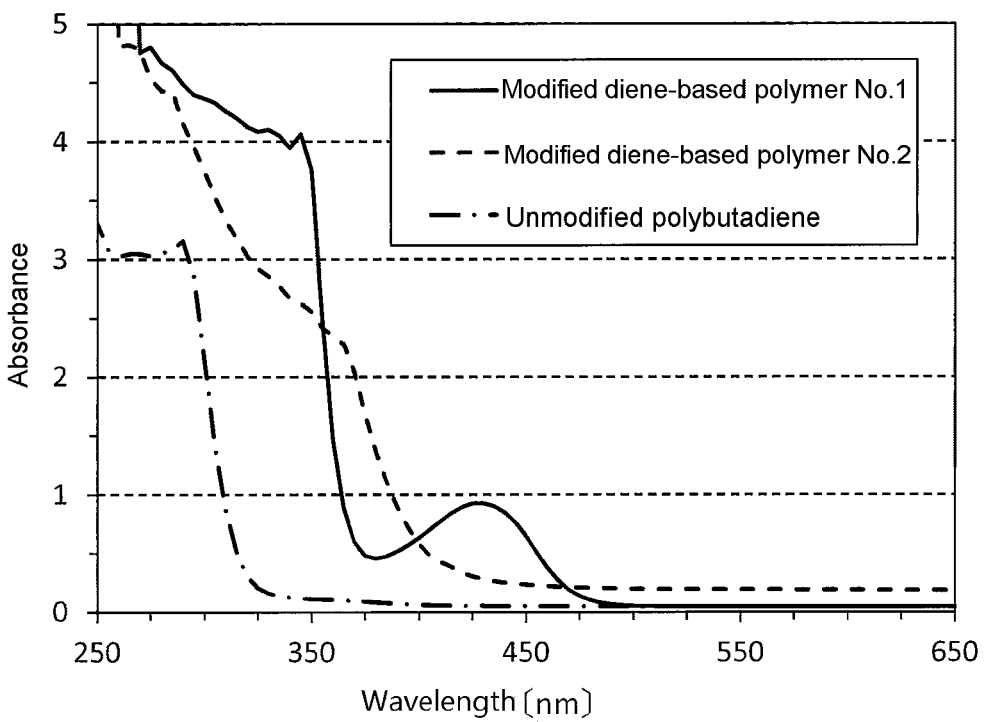
FIG. 4 is UV-VIS spectrum of the modified diene-based polymers No. 1, 2 and the unmodified polybutadiene.

The $^1$HNMR measurement, IR measurement, UV-VIS measurement, chloroform dissolving experiment, and network chain density measurement were performed for the modified diene-based polymers No. 1 and 2 obtained above and the unmodified polybutadiene rubber. Table 1 shows the results of the chloroform dissolving experiment and network chain density measurement. FIG. 1 shows the results of the $^1$HNMR measurement of the modified diene-based polymer. FIGS. 2 and 3 show the results of the IR measurement. FIG. 4 shows the results of the UV-VIS measurement.

TABLE 1

| | Modified diene-based polymer No. 1 | Modified diene-based polymer No. 2 | Unmodified polybutadiene |
|---|---|---|---|
| Introduction of substituent group | Having the structure represented by the formula (1-1) | Having the structure represented by the formula (1) | — |
| Chloroform dissolving experiment | Dissolved | Swollen | Dissolved |
| Network chain density (mmol/cm$^3$) | Less than 0.01 | 0.051 | Less than 0.01 |

It was confirmed from the results of the $^1$HNMR measurement, IR measurement and UV-VIS measurement that the modified diene-based polymer No. 1 had the structure represented by the formula (1-1), and the modified diene-based polymer No. 2 had the structure represented by the formula (1).

The modified diene-based polymer No. 1 and the unmodified polybutadiene rubber were dissolved in chloroform and toluene. Thus, their molecular chains were not crosslinked. Compared to this, the modified diene-based polymer No. 2 was not dissolved in chloroform, and the sample was swollen. Thus, the modified diene-based polymer No. 2 had some degree of crosslinking formed between the molecular chains of the diene-based polymer when the functional group having the dithioester structure was introduced.

It is considered that a graft chain is easily formed at the part of the modified diene-based polymer according to the present invention where the substituent group having the dithioester structure has been introduced. Thus, the modified diene-based polymer according to the present invention is useful as a material for forming a crosslinked structure.

This application is based on Japanese patent application No. 2021-063768 filed on Apr. 2, 2021, the content of which is hereby incorporated by reference.

The invention claimed is:

1. A modified diene-based polymer having a dithioester structure represented by the formula (1):
    wherein an amount of the dithioester structure represented by the formula (1) in the modified diene-based polymer ranges from 0.01 mass % to 100 mass %, and the dithioester structure is introduced at a portion that forms a graft chain:

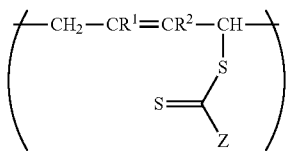
(1)

wherein in the formula (1),

R$^1$ and R$^2$ represent a hydrogen atom, a methyl group, an ethyl group, a n-propyl group, an isopropyl group, a n-butyl group, a s-butyl group, or a t-butyl group; and Z is an alkyl group having 1 to 18 carbon atoms, or a structure represented by any one of the formulae (11), (12), (13), (15), or (16):

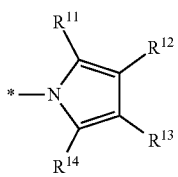
(11)

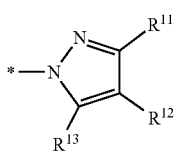
(12)

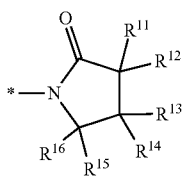
(13)

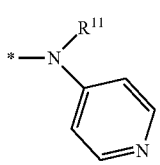
(15)

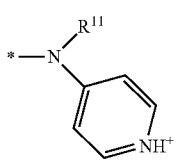
(16)

wherein in the formulae (11), (12), (13), (15), and (16), R$^{11}$ to R$^{16}$ represent an alkyl group having 1 to 18 carbon atoms, an aryl group having 6 to 20 carbon atoms, an aralkyl group having 6 to 20 carbon atoms, a hydrogen atom, or a halogen atom.

2. The modified diene-based polymer according to claim 1, wherein the modified diene-based polymer has a structure represented by the formula (1-1):

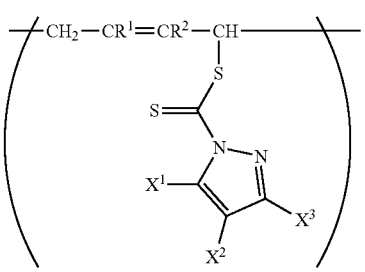
(1-1)

wherein in the formula (1-1), R$^1$ and R$^2$ represent a hydrogen atom, a methyl group, an ethyl group, a n-propyl group, an isopropyl group, a n-butyl group, a s-butyl group, or a t-butyl group; and X$^1$, X$^2$ and X$^3$ represent an alkyl group having 1 to 18 carbon atoms, an aryl group having 6 to 20 carbon atoms, an aralkyl group having 6 to 20 carbon atoms, a hydrogen atom, or a halogen atom.

3. The modified diene-based polymer according to claim 1, wherein the modified diene-based polymer has an absorption peak in a wavelength range from 350 nm to 600 nm in an ultraviolet-visible light absorption spectrum.

4. The modified diene-based polymer according to claim 1, wherein the modified diene-based polymer has a network chain density of 0.05 mmol/cm$^3$ or less calculated by Flory-Rehner equation.

5. The modified diene-based polymer according to claim 2, wherein in the formula (1-1), X$^1$ to X$^3$ are an alkyl group having 1 to 4 carbon atoms, or a hydrogen atom.

6. The modified diene-based polymer according to claim 1, wherein the modified diene-based polymer further has a structure represented by the formula (2):

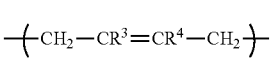
(2)

wherein in the formula (2), R$^3$ and R$^4$ represent an alkyl group having 1 or more carbon atoms, an aryl group having 6 or more carbon atoms, an aralkyl group having 6 or more carbon atoms, a hydrogen atom, or a halogen atom.

7. The modified diene-based polymer according to claim 6, wherein in the formula (2), R$^3$ and R$^4$ are a hydrogen atom, a halogen atom, or an alkyl group having 1 to 18 carbon atoms.

8. The modified diene-based polymer according to claim 6, wherein in the formula (2), R$^3$ and R$^4$ are a hydrogen atom, a methyl group, an ethyl group, a n-propyl group, an isopropyl group, a n-butyl group, a s-butyl group, or a t-butyl group.

9. The modified diene-based polymer according to claim 6, wherein a total amount of the structure represented by the formula (1) and the structure represented by the formula (2) in the modified diene-based polymer ranges from 0.01 mass % to 100 mass %.

10. The modified diene-based polymer according to claim 2, wherein the modified diene-based polymer has an absorption peak in a wavelength range from 350 nm to 600 nm in an ultraviolet-visible light absorption spectrum, and a network chain density of 0.05 mmol/cm$^3$ or less calculated by Flory-Rehner equation.

11. The modified diene-based polymer according to claim 1, wherein the dithioester structure is introduced by a reaction of a diene-based polymer and a dithioester compound.

12. The modified diene-based polymer according to claim 11, wherein the reaction of the diene-based polymer and the dithioester compound is carried out by irradiating a mixture of the diene-based polymer and the dithioester compound.

13. The modified diene-based polymer according to claim 11, wherein the diene-based polymer is a copolymer formed from a conjugated diene monomer represented by formula (3):

$$CH_2=CR^5-CR^6=CH_2 \qquad (3)$$

wherein in formula (3), $R^5$ and $R^6$ represent a hydrogen atom, a methyl group, an ethyl group, a n-propyl group, an isopropyl group, a n-butyl group, a s-butyl group, or a t-butyl group.

14. The modified diene-based polymer according to claim 11, wherein the dithioester compound is a compound represented by the formula (4) or a compound represented by the formula (5):

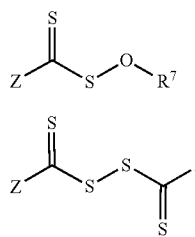

(4)

(5)

wherein in the formulae (4) and (5), $R^7$ represents a monovalent hydrocarbon group optionally having a substituent group, and Z is an alkyl group having 1 to 18 carbon atoms, or a structure represented by any one of the formulae (11), (12), (13), (15), or (16):

(11)

(12)

(13)

(14)

(15)

(16)

wherein in the formulae (11), (12), (13), (15), and (16), $R^{11}$ to $R^{16}$ represent an alkyl group having 1 to 18 carbon atoms, an aryl group having 6 to 20 carbon atoms, an aralkyl group having 6 to 20 carbon atoms, a hydrogen atom, or a halogen atom.

* * * * *